United States Patent [19]
Holan

[11] 3,881,030
[45] Apr. 29, 1975

[54] 2,2-DIPHENYL-3,3-DIMETHYLOXETONE INSECTICIDES

[75] Inventor: George Holan, Brighton, Victoria, Australia

[73] Assignee: Commonwealth Scientific and Industrial Research Organization, Campbell, Australia

[22] Filed: Aug. 22, 1973

[21] Appl. No.: 390,507

Related U.S. Application Data

[62] Division of Ser. No. 162,262, July 13, 1971, Pat. No. 3,776,925.

[30] Foreign Application Priority Data

July 23, 1970 Australia.............................. 1945/70
Feb. 5, 1971 Australia.............................. 3948/71
Feb. 12, 1971 Australia.............................. 4010/71

[52] U.S. Cl................................. 424/278; 424/282
[51] Int. Cl............................. A01n 9/12; A01n 9/28
[58] Field of Search..................... 424/278; 260/333

[56] References Cited
UNITED STATES PATENTS

| | | | |
|---|---|---|---|
| 3,644,418 | 2/1972 | Holan | 260/333 |
| 3,776,925 | 12/1973 | Holan | 260/333 |

FOREIGN PATENTS OR APPLICATIONS

| | | | |
|---|---|---|---|
| 1,164,471 | 9/1969 | United Kingdom | 260/333 |

OTHER PUBLICATIONS

Arnold et al. Tetrahedron Letters No. 22, pp. 1425–1430 (1964).

*Primary Examiner*—Albert T. Meyers
*Assistant Examiner*—Leonard Schenkman
*Attorney, Agent, or Firm*—Bacon & Thomas

[57] ABSTRACT

The invention provides derivatives of 2,2-diphenyl-3,3-dimethyloxetane in which the phenyl groups are substituted with alkoxy, alkylthio and/or methylenedioxy groups, which have insecticidal properties and the invention also provides insecticidal compositions thereof.

6 Claims, No Drawings

2,2-DIPYENYL-3,3-DIMETHYLOXETONE INSECTICIDES

This is a division of application Ser. No. 162,262 filed July 13, 1971, and issued on December 4, 1973, as Patent No. 3,776,925.

This invention relates to new insecticidal compounds, methods for preparing these compounds and to new insecticidal compositions containing the compounds.

Throughout this specification, where the context permits, the word "insect" is used in its broad common usage and includes spiders, mites, nematodes and other pests which are not classed as insects in the strict biological sense. Thus the term implies reference not only to those small invertebrate animals belonging mostly to the class Insecta, comprising six-legged, usually winged forms, such as beetles, bugs, flies and the like, but also to other allied classes of arthropods whose members are wingless and usually have more than six legs, such as spiders, centipedes, wood lice and the like, and especially to the order Acaridae which includes the mites and ticks. The words "insecticide" and "insecticidal" are similarly used.

The insecticidally active compounds provided by this invention have the general formula I

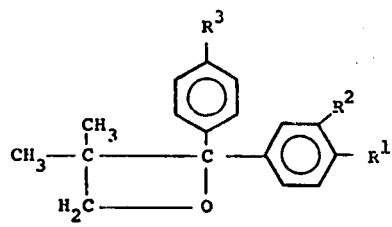

where $R^1$ is a methoxy, ethoxy, n-propoxy, methylthio, ethylthio or propylthio group and $R^2$ is hydrogen; or $R^1$ and $R^2$ together form a methylenedioxy group (i.e. —O—CH$_2$—O—); and $R^3$ is a methoxy, n-propoxy, methylthio, ethylthio or propylthio group. These compounds have insecticidal properties.

A compound named as 2,2-bis(p-methoxyphenyl)-3,3-dimethyloxetane (Formula I, $R^1$ = OCH$_3$, $R^2$ = H, $R^3$ = OCH$_3$) has been reported by Arnold et al (Tetrahedron Letters, 22, 1425, (1964), but it was not isolated in the pure state nor fully and unambigously characterised. This is doubtless attributable to the instability of the methoxy compound which we have now observed. However, we are now able to fully characterize the compound and it is to be noted that its insecticidal properties have not been described hitherto.

The compounds of formula I where $R^2$ = hydrogen and $R^1$ = $R^3$ = methoxy or n-propoxy, tend to be unstable and therefore unsuitable as commercial insecticides. Thus the preferred class of compounds provided by this invention are those of formula I where $R^1$ and $R^3$ are not identical groups, except where $R^1$ = $R^3$ = ethoxy.

Still more preferred is the group of such compounds in which $R^1$ and $R^3$ are each a methoxy, ethoxy or n-propoxy group and the groups $R^1$ and $R^3$ together contain more than 2 but less than 6 carbon atoms. The most preferred compounds are 2,2-bis(p-ethoxyphenyl)-3,3-dimethyloxetane (Ia)

2-p-ethoxyphenyl-2-p-methoxyphenyl-3,3-dimethyloxetane (Ib)

and 2-p-ethoxyphenyl-2-pethylthiophenyl-3,3-dimethyloxetane (Ic)

The invention also includes methods for the synthesis of the new compounds, and in accordance with one such aspect of the invention, there is provided a process for preparing a compound of formula I as stated and defined above which comprises irradiating with ultraviolet radiation a mixture of a compound of formula II

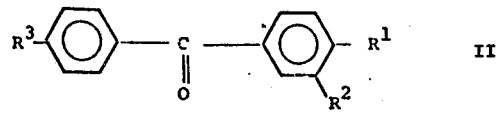

where $R^1$, $R^2$ and $R^3$ are as defined above and isobutylene (i.e. 2-methylpropene-1).

Preferably the two reactants are dissolved in a suitable solvent, such as for example, benzene. It is desirable to commence the reaction with a substantial excess of isobutylene present.

In general the most suitable radiation is of a wavelength above 3000 A. Preferably the ultra-violet radiation is of comparatively long wavelength such as that transmitted by 'Pyrex' glass. ("Pyrex" is a Registered Trade Mark for borosilicate glass).

The product (compound I) may be isolated by evaporation of the solvent and working up in a conventional manner. The pure products are crystalline solids or oils.

Other methods of preparation of the compounds I are also available. For example, the compound can be prepared by the reaction of the appropriate p-alkoxyphenylmagnesium halide or halides with α,α-dimethylpropiolactone, or with a β-bromo-α,α-dimethylpropionyl halide.

The new compounds described herein may be incorporated in a suitable inert solvent, or mixture of solvents, or in a solid mixture, with or without other substances, such as setting, dispersing and sticking agents. The compounds may be employed in such compositions either as the sole toxic agent or in combination with other insecticides such as pyrethrum, rotenone, or with fungicidal or bactericidal agents, to provide compositions useful for household and agricultural dusts and sprays, textile coating and impregnation, and the like. The compounds may be dissolved in suitable organic solvents to provide solutions of enhanced utility. The new compounds may also be placed in aqueous suspension by dispersing organic solvent solutions of the compounds in water. The new compounds may also be mixed with an inert, finely divided, solid diluent or carrier. The insecticidal compounds may be admixed in their original forms or in solution. The new compounds are active against injurious insects of many kinds, such as moths, mosquitos, flies, beetles and others.

In particular, the compounds of the invention may be advantageously combined with other substances which have a synergistic or potentiating action. Generally such substances of the class of mixed function oxidase inhibitors, i.e. they inhibit the detoxification of insecticides in insects produced by the action of oxidative enzymes. Typical substances of this type are the pyrethrin synergists such as piperonyl butoxide, piperonyl cyclonene, "Sesoxane," "Sesamex," "Sulfoxide," n-propylisome and sesamine oil extractives. We have found that the substance 'Sesoxane' (made by Shulton Inc., Clifton, N.J.,) is particularly useful as a potentiator. ('Sesoxane' is stated to be 2-(3,4-methyl-dioxyphenoxy)-3,6,9,-trioxaudecane). The amount of 'Sesoxane' used may vary from 1/1000th to five times the weight of the compound I the preferred range being from about 1/100th to an equal part by weight. Piperonyl butoxide also is a useful potentiator in similar amounts.

The preparation and properties of the compounds of formula I are illustrated by the following specific examples. It should be noted, of course, that these examples are intended to be illustrative of the methods and procedures utilized in preparing the compounds and that they are not intended to be restrictive or to be regarded as embodying the only way in which the compounds can be formed and recovered.

EXAMPLE I

General Method for Preparation of Compounds of formula I.

The substituted benzophenone of formula II (2.7gm) was dissolved in benzene (30ml) and the solution was cooled while isobutylene (20ml) was added. The reaction solution was blanketed with nitrogen and irradiated with an ultraviolet high-pressure lamp (Phillips Type 125 W HPK) through a "Pyrex" glass filter at room temperature. After seven hours the benzophenone disappeared from the reaction mixture as shown by the infrared spectrum. Irradiation was stopped and the solution was evaporated. The residue obtained was distilled under high vacuum to purify the oily products. Solid products were recrystallised from petroleum ether (b.p. 30°–40°C) at low temperatures or from methanol.

Some products thus obtained are listed below, together with characterizing data.

2,2-bis(p-methoxyphenyl)-3,3-dimethyloxetane:
Analysis -
Found: C,76.84; H,7.80; $C_{19}H_{22}O_3$ requires C,76.48; H,7.43.

2-(p-methoxyphenyl)-2-(p-ethoxyphenyl)-3,3-dimethyloxetane:
Analysis - Found: C77.07; H,7.80; $C_{20}H_{24}O_3$ requires C,76.89; H,8.74.

2,2-bis(p-ethoxyphenyl)-3,3-dimethyloxetane: Mp (from methanol) 93°C.

2,2-bis(p-n-propoxyphenyl)-3,3-dimethyloxetane:
Analysis -
Found: C,78.54; H,8.71; $C_{23}H_{30}O_3$ requires C,77.93; H,8.53.

2-p-ethoxyphenyl-2-p-ethylthiophenyl-3,3-dimethyloxetane: Analysis - Found: C,73.5; H,8,18; 8.18; $21H_{26}O_2S$ required C,73.6; H,7.7.

In each case the infrared and NMR spectra were consistent with the named compound.

The compound 2-p-ethoxyphenyl-2-p-ethylthiophenyl-3,3-dimethyloxetane was prepared from 4-ethoxy-4'-ethylthiobenzophenone. The latter compound is new and was prepared as follows:

A solution of p-ethoxybenzoyl chloride (20.0g) and ethyl phenyl sulphide (17.8g) was added to a stirred mixture of aluminium chloride (16.0g) and carbon disulphide (64 ml) at 20° to 25°C over 25 minutes. The mixture was refluxed for 30 minutes. Carbon disulphide (30 ml) was removed and the remaining mixture slowly diluted with ice-cold water (60 ml) before distilling off the remaining carbon disulphide. The product was filtered off and crystallised from ethanol to give 24.6 g (79.4%) of 4-ethoxy-4'-ethylthiobenzophenone, m.p. 126°C. The product is characterised by a consistent analysis and by its Proton Magnetic Resonance spectrum as follows:

$\delta = 1.41$ (6H, multiplet); 2.99 (2H, quartet); 4.10 (2H, quartet); 7.25 (8H, multiplet) ppm.

EXAMPLE 2

Preparation of 2,2-bis-(p-ethoxyphenyl)-3,3-dimethyl oxetane. (Alternative method).

To a refluxing solution in diethyl ether (50 ml) of a Grignard reagent prepared from magnesium (1.95 gm) and p-bromophenetole (16.0 gm) a solution of $\alpha,\alpha$-dimethylpropiolactone (4.0 gm) in ether (50 ml) was added with vigorous stirring. The reaction mixture was stirred at room temperature for another 2 hours. The solution was then cooled to 10°C and the adduct decomposed with dilute HCl (16 ml, 6.5N).

The ether layer was separated washed with NaOH (20 ml, 5%) followed by saturated NaCl solution. The solvent layer was dried and evaporated to give an oil. This was recrystallised from petroleum ether (b.p. 30°–40°) to give 1.4 gm of the product m.p. 93°C.

The product (and that obtained as in Example 1) is characterised by analysis and by Proton Magnetic Resonance spectrum (relative to tetramethylsilane) as follows:

$\delta =$ 1.08 (6H, singlet); 1.37 (6H triplet); 3.94 (4H quartet); 4.18 (2H singlet); 7.01 (8H multiplet). ppm.

The infrared spectrum showed an absorption maximum at 1000 $cm^{-1}$ characteristic of the oxetane ring.

EXAMPLE 3

Insecticidal Activity

The following test method was used to determine the activities of the compounds of the foregoing Examples.

Tests were carried out on the common housefly, using a standard DDT-susceptible strain (WHO/IN/-Musca domestica/l). The compound was applied in an acetone solution by microsyringe to the dorsum of the thorax of two day old female flies reared from pupae of average weight 2.2 – 2.5 gm/100 pupae. The adult flies were fed on water and sugar-only diet and maintained at 26°C and 70% RH. The mortalities were counted at 48 hours after treatment and compared with acetone-treated controls. Flies unable to move or stand normally were considered dead. The $LD_{50}$ values obtained from a logit computer programme based on three replicates of 10 flies at each dose level are given in Table 2.

Potentiation

The above compounds were also tested on the insects described above in conjunction with the potentiator "Sesoxane" by applying 0.5 microlitres of a 1% w/v acetone solution of "Sesoxane" with the compound under test.

The mortalities were counted at 48 hours after treatment and compared with acetone and acetone/potentiator controls.

The LD$_{50}$ values were determined as described above and the results are also given in Table 2.

TABLE 2

| Compound of formula I* | | LD$_{50}$ values (μg/insect) | |
|---|---|---|---|
| R$^1$ | R$^3$ | Unpotentiated | Potentiated |
| MeO | MeO | 5.3 | 0.25 |
| MeO | EtO | 1.43 | 0.086 |
| EtO | EtO | 0.52 | 0.01 |
| EtO | EtS | 1.4 | 0.13 |
| PrO | PrO | 5.3 | 0.7 |

(*R$^2$ = H; MeO = methoxy; EtO = ethoxy; PrO = n-propoxy)

Thus at the specified concentration, "Sesoxane" increases the activity of the compound by a factor of up to 50.

About the same level of potentiation was obtained when "Sesoxane" was replaced by an equal amount of piperonyl butoxide.

EXAMPLE 4

The following are examples of insecticidal compositions in accordance with the invention. All parts are by weight.

a. Spray formulation

The following composition is adapted for spray application.

| Compound of formula I | 4.0 |
|---|---|
| "Sesoxane" or Piperonyl butoxide | 1.0 |
| Deodorized kerosene | 79.4 |
| Alkylated napthalene | 16.0 | b. Aerosol

The following materials are metered into a suitable 'bomb' container sealed and equipped with a valve in the usual way.

| Compound of formula I | 3.0 |
|---|---|
| Potentiator | 1.0 |
| Methylene chloride | 10.0 |
| 'Freon 12' | 43.0 |
| 'Freon 11' | 43.0 |

I claim:

1. An insecticidal composition comprising an insecticidally effective amount of a compound selected from the group consisting of 2,2-bis (p-ethoxyphenyl)-3,3-dimethyloxetane, 2-p-ethoxyphenyl-2-p-methoxyphenyl-3,3-dimethyloxetane and 2-p-ethoxyphenyl-2-p-ethylthiophenyl-3,3-dimethyloxetane and a carrier therefor.

2. An insecticidal composition as claimed in claim 1, comprising in addition, a potentiating amount of a pyrethrin synergist.

3. An insecticidal composition as claimed in claim 2, wherein the pyrethrin synergist is 2(3,4-methylenedioxyphenoxy)-3, 6, 9-trioxaudecane or piperonyl butoxide.

4. An insecticidal composition as claimed in claim 2, wherein the pyrethrin synergist is present in an amount from about 1/1000th to twice the weight of the said compound.

5. An insecticidal composition as claimed in claim 2, wherein the pyrethrin synergist is present in an amount from about 1/100th to an equal part by weight of the said compound.

6. A method of combatting insects comprising contacting an insect with an insecticidally effective amount of a compound of the formula:

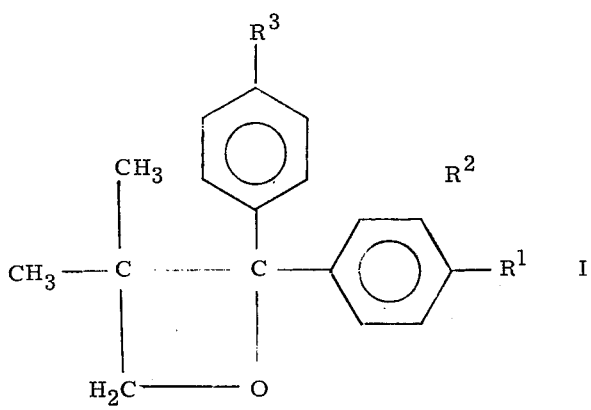

wherein R$^1$ is selected from the group consisting of methoxy, ethoxy, n-propoxy, methylthio, ethylthio and propylthio; R$^2$ is hydrogen; and R$^3$ is selected from the group consisting of methoxy, ethoxy, n-propoxy, methylthio, ethylthio and propylthio.

* * * * *